United States Patent
Sakurada et al.

(10) Patent No.: US 9,144,998 B2
(45) Date of Patent: Sep. 29, 2015

(54) PRINTING METHOD AND PRINTING APPARATUS

(71) Applicant: SEIKO EPSON CORPORATION, Tokyo (JP)

(72) Inventors: Kazuaki Sakurada, Suwa (JP); Nao Kaneko, Tokyo-to (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/172,965

(22) Filed: Feb. 5, 2014

(65) Prior Publication Data
US 2014/0253621 A1 Sep. 11, 2014

(30) Foreign Application Priority Data
Mar. 5, 2013 (JP) ................................. 2013-042994

(51) Int. Cl.
*B41J 2/21* (2006.01)
*H04N 1/54* (2006.01)

(52) U.S. Cl.
CPC .............. *B41J 2/2132* (2013.01); *B41J 2/2114* (2013.01); *H04N 1/54* (2013.01)

(58) Field of Classification Search
USPC ......................................... 347/11, 12, 14, 19
See application file for complete search history.

(56) References Cited

U.S. PATENT DOCUMENTS

| | | | |
|---|---|---|---|
| 7,976,145 B2 * | 7/2011 | Hara | 347/98 |
| 8,894,172 B2 * | 11/2014 | Mitsuzawa | 347/14 |
| 2004/0233463 A1 * | 11/2004 | Hersch et al. | 358/1.9 |
| 2007/0013759 A1 * | 1/2007 | Kadomatsu et al. | 347/102 |
| 2011/0141177 A1 * | 6/2011 | Izuo | 347/14 |
| 2012/0194833 A1 * | 8/2012 | Hara et al. | 358/1.9 |
| 2012/0313992 A1 * | 12/2012 | Wada et al. | 347/15 |
| 2013/0128291 A1 * | 5/2013 | Shibasaki et al. | 358/1.9 |
| 2013/0194327 A1 * | 8/2013 | Hara et al. | 347/7 |

FOREIGN PATENT DOCUMENTS

JP 2009-172972 8/2009

* cited by examiner

*Primary Examiner* — Matthew Luu
*Assistant Examiner* — Lily Kemathe
(74) *Attorney, Agent, or Firm* — Workman Nydegger

(57) ABSTRACT

The invention relates to a printing method of creating an image on a medium by discharging a plurality of colored inks each containing a colorant and clear ink containing no colorant from a nozzle toward the medium. Further the colored inks are discharged from the nozzle toward a unit region defined in the medium by an amount determined on the basis of respective amounts of cyan ink and magenta ink included in the colored inks to be discharged to the unit region.

8 Claims, 7 Drawing Sheets

FIG. 3A

<NORMAL LUT>

| INPUT VALUE | | | OUTPUT VALUE | | | |
|---|---|---|---|---|---|---|
| R | G | B | Y | M | C | K |
| 0 | 0 | 0 | Vy0 | Vm0 | Vc0 | Vk0 |
| ⋮ | ⋮ | ⋮ | ⋮ | ⋮ | ⋮ | ⋮ |
| Vr | Vg | Vb | Vy | Vm | Vc | Vk |
| ⋮ | ⋮ | ⋮ | ⋮ | ⋮ | ⋮ | ⋮ |
| 255 | 255 | 255 | Vy255 | Vm255 | Vc255 | Vk255 |

FIG. 3B

<EMBEDDING MITIGATION LUT>

| INPUT VALUE | | | OUTPUT VALUE | | | | |
|---|---|---|---|---|---|---|---|
| R | G | B | Y | M | C | K | Cl |
| 0 | 0 | 0 | Vy0 | Vm0 | Vc0 | Vk0 | Vcl0 |
| ⋮ | ⋮ | ⋮ | ⋮ | ⋮ | ⋮ | ⋮ | ⋮ |
| Vr | Vg | Vb | Vy | Vm | Vc | Vk | Vcl |
| ⋮ | ⋮ | ⋮ | ⋮ | ⋮ | ⋮ | ⋮ | ⋮ |
| 255 | 255 | 255 | Vy255 | Vm255 | Vc255 | Vk255 | Vcl255 |

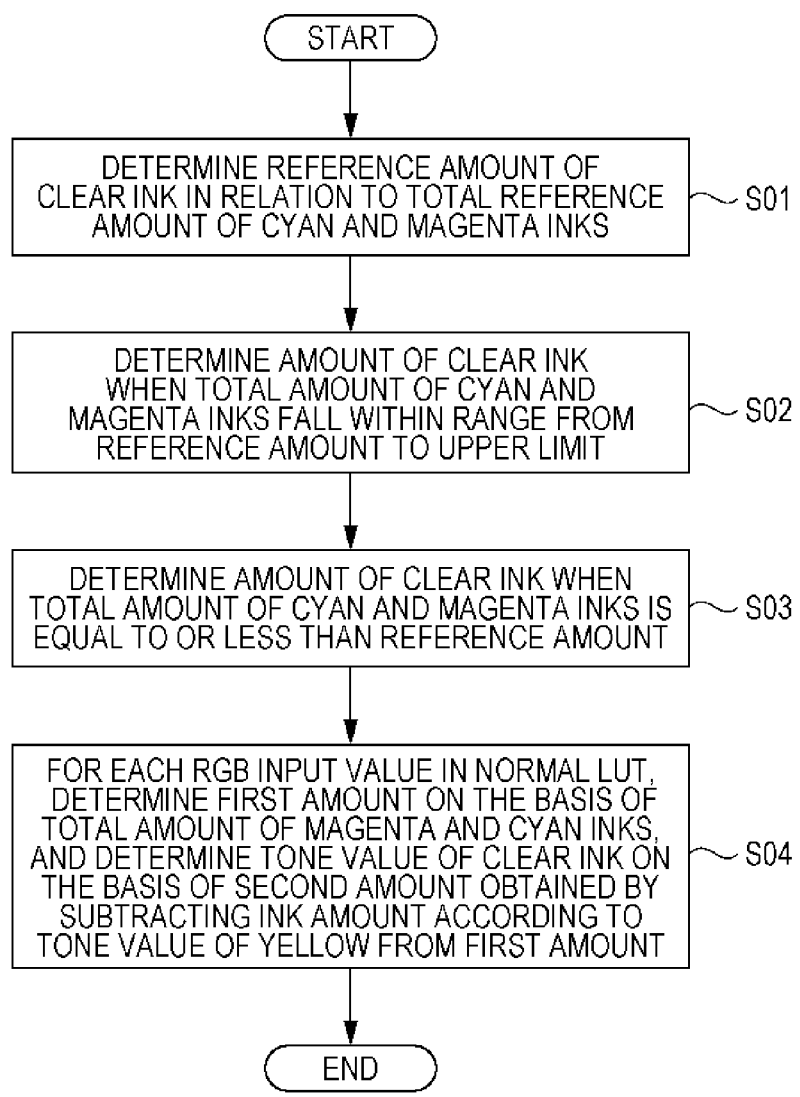

PRINTING METHOD AND PRINTING APPARATUS

BACKGROUND

1. Technical Field

The present invention relates to a printing method and a printing apparatus.

2. Related Art

There are printing methods (ink jet recording methods) of printing an image on a medium by discharging ink from nozzles toward the medium. In these methods, various types of ink, including colored ink such as yellow ink, magenta ink, cyan ink, and black ink, and colorant-free clear ink, are used. Furthermore there is proposed a printing method that aims to mitigate the embedding of colored ink in a medium (image) (for example, refer to JP-A-2009-172972). In this method, first a droplet of clear ink is ejected onto the medium, and then a droplet of colored ink is ejected onto the medium so that it lands on the droplet of the clear ink. Then the colored ink droplet spreads on the clear ink droplet while staying wet. With this method, the diameter of a dot formed with the colored ink can be made larger than that formed with colored ink alone. Consequently it is possible to mitigate the embedding of colored ink in a medium.

By discharging colored ink and clear ink in the above manner, the embedding of the colored ink in a medium can be mitigated, but the resultant image is more prone to become blurred as a larger amount of clear ink is discharged. For example, if clear ink is discharged onto an image such that droplets of all the types of colored ink (e.g., yellow ink, magenta ink, cyan ink, and black ink) will land on droplets of the clear ink, namely, if clear ink is uniformly discharged onto a whole image, the resultant image may become blurred, in which case the quality of the image is lowered.

SUMMARY

An advantage of some aspects of the invention is to provide a printing method and a printing apparatus, which are capable of mitigating the embedding of colored ink in a medium (image) and reducing the blurring of the image.

According to an aspect of the invention, there is provided a printing method of creating an image on a medium by discharging a plurality of colored inks each containing a colorant and clear ink containing no colorant from a nozzle toward the medium. Further the colored inks are discharged from the nozzle toward a unit region defined in the medium by an amount determined on the basis of respective amounts of cyan ink and magenta ink included in the colored inks to be discharged toward the preset unit region. Other features of the invention will be understood from the descriptions of the specification and the accompanying drawings.

BRIEF DESCRIPTION OF THE DRAWINGS

The invention will be described with reference to the accompanying drawings, wherein like numbers reference like elements.

FIGS. 3A and 3B are explanatory views showing color conversion lookup tables.

FIG. 4 shows a flowchart of processing for creating an embedding mitigation LUT.

DESCRIPTION OF EXEMPLARY EMBODIMENTS

Contents of Disclosure

Figure 1:
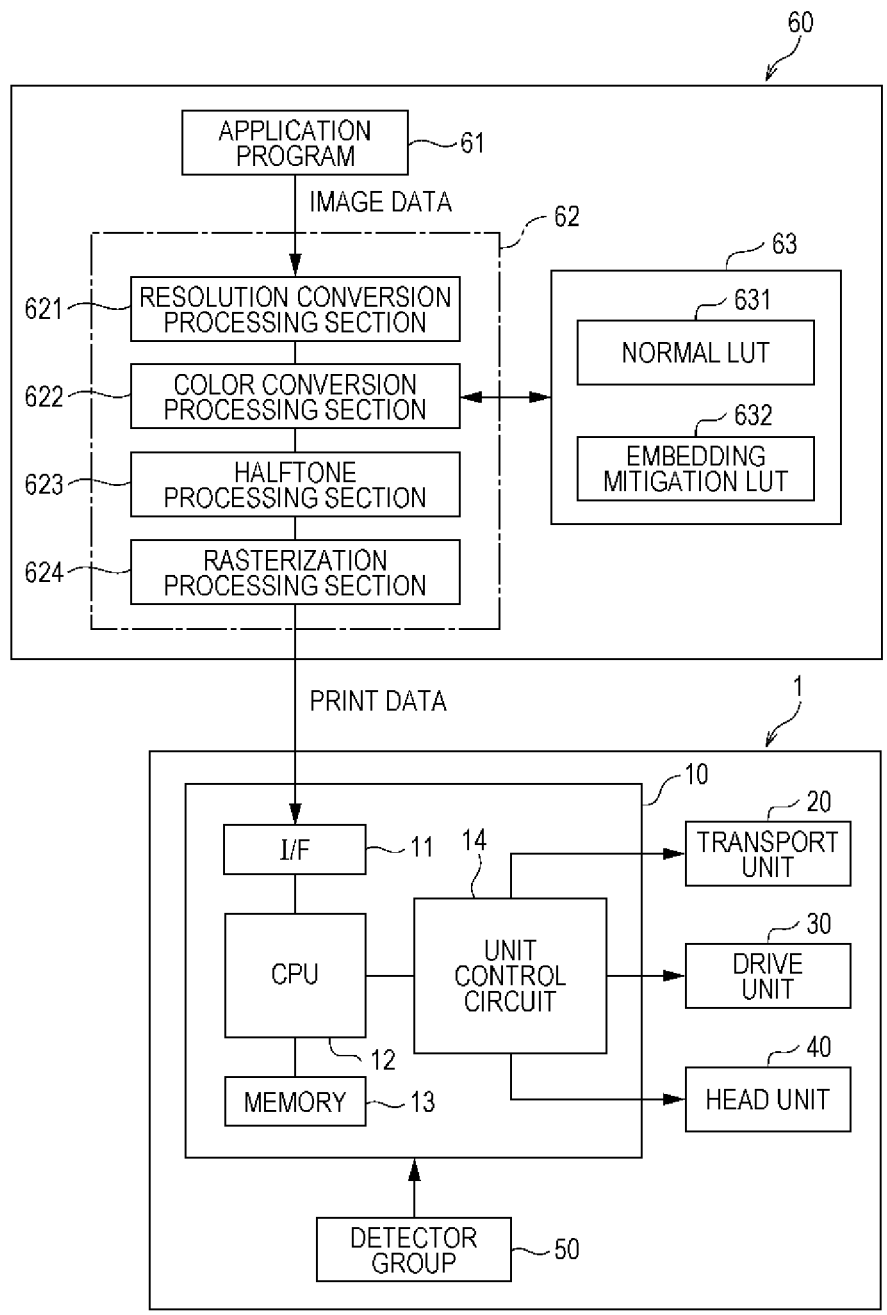
FIG. 1 is a block diagram showing an overall configuration of a printing system.

At least the following matters will be cleared from the descriptions of the specification and the accompanying drawings.

There is provided a printing method of creating an image on a medium by discharging a plurality of colored inks each containing a colorant and clear ink containing no colorant from a nozzle toward the medium. Further the colored inks are discharged from the nozzle toward a unit region defined in the medium by an amount determined on the basis of respective amounts of cyan ink and magenta ink included in the colored inks to be discharged onto the unit region.

With this printing method, the diameter of each of dots formed with the colored inks (cyan ink and magenta ink) is increased. It is thus possible to mitigate the embedding of colored ink in a medium (image) and to reduce the blurring of an image.

In the above printing method, the clear ink may be discharged from the nozzle toward the unit region of the medium by a second amount. The second amount is obtained by subtracting an amount of yellow ink included in the colored inks to be discharged to the unit region from a first amount. The first amount is determined on the basis of the respective amounts of the cyan ink and the magenta ink to be discharged to the unit region.

This printing method makes it possible to further reduce the blurring of an image, and to lessen the reduction in the color reproducibility of an image which would occur due to excessive discharging of clear ink.

In the above printing method, first the clear ink may be discharged from the nozzle toward the unit region of the medium, and then the colored inks may be discharged from the nozzle toward the unit region.

With this printing method, a large amount of colored ink is left on the medium. It is thus possible to improve the color reproduction of an image.

In the above printing method, a coating layer may be formed on the image having been formed on the medium with the colored ink and the clear ink, through the discharging of the clear ink from the nozzle onto the image.

This printing method makes it possible to improve the resistance of an image formed with colored inks and clear ink to abrasion, and the luster of an image.

A printing apparatus includes: a plurality of colored nozzle groups that can individually discharge a plurality of colored inks, each colored ink containing a colorant, the colored inks including cyan ink and magenta ink; and a clear nozzle group that can discharge clear ink, the clear ink containing no colorant. A control section determines an amount by which the clear ink is discharged onto a unit region defined in a medium, on the basis of respective amounts of the cyan ink and the magenta ink to be discharged onto the unit region. In addition the control section creates an image on the medium by causing the clear nozzle group to discharge the clear ink toward the unit region by the determined amount and causing the colored nozzle groups to discharge the colored inks toward the unit region.

With this printing apparatus, the diameter of each of dots formed with the colored inks (cyan ink and magenta ink) is increased. It is thus possible to mitigate the embedding of colored ink in a medium (image) and to reduce blurring of an image.

In the above printing apparatus, the control section may determine a second amount by which the clear ink is discharged onto the unit region of the medium. The second amount is obtained by subtracting an amount of yellow ink included in the colored inks to be discharged onto the unit region from a first amount. The first amount is the amount of clear ink which has been determined on the basis of the respective amounts of the cyan ink and the magenta ink to be discharged onto the unit region.

This printing apparatus makes it possible to further reduce the blurring of an image, and to lessen the reduction in the color reproducibility of an image which would occur due to excessive discharging of clear ink.

In the above printing apparatus, the control section may refer to a color conversion table in which a tone value of input image data in a color space is related to a tone value of each color of the plurality of colored inks and the clear ink, and determine the amount by which the clear ink is discharged onto the unit region of the medium, by subjecting the input image data to a color conversion.

With this printing apparatus, the amount of clear ink to be discharged onto a unit region of a medium can be determined on the basis of the respective amounts of cyan ink and magenta ink to be discharged onto the unit region.

In the above printing apparatus, the control section may form a coating layer on the image having been formed on the medium with the colored inks and the clear ink, by causing the clear nozzle group to discharge the clear ink onto the image. This clear nozzle group has also been used to form the image.

This printing apparatus makes it possible to improve the resistance of an image formed with colored ink and clear ink to abrasion and the luster of an image, without increasing the number of nozzles.

Printing System

Figure 2A:
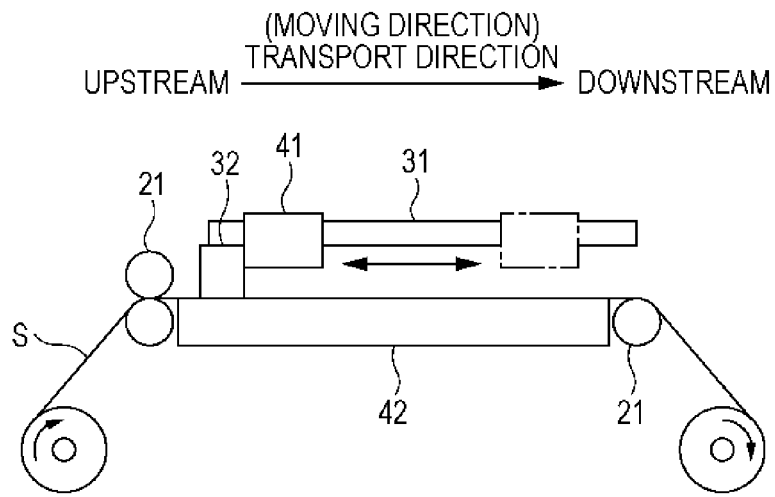
FIGS. 2A and 2B schematically show a cross section and top view, respectively, of a printer.
Figure 2B:
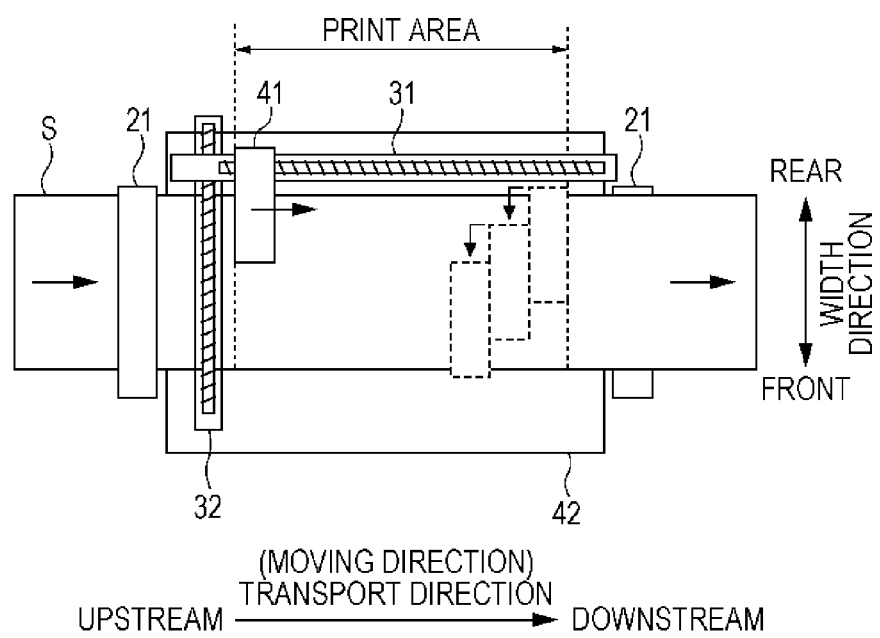

FIG. 1 is a block diagram showing an overall configuration of a printing system. FIGS. 2A and 2B schematically show a cross section and top view, respectively, of an ink jet printer 1 (referred to below as a printer 1). FIGS. 3A and 3B are explanatory views showing color conversion lookup tables (LUTs). A description will be given of embodiments of the invention by exemplifying a printing system in which the printer 1 is connected to a computer 60.

Computer 60

The computer 60 and the printer 1 are interconnected in a communicable manner. In the computer 60, various programs, including an application program 61 and a printer driver 62, are executable under an operating system. For example, the application program 61 has a function of creating image data through image editing; the printer driver 62 has a function of converting the image data output from the application program 61 into print data. The printer driver 62 may be stored in a recording medium, such as a CD-ROM, that can be read by the computer 60, or downloaded to the computer 60 through the Internet or any other network by means of a certain communication scheme.

When the application program 61 receives a print instruction, it outputs the image data to the printer driver 62. Upon receiving the image data from the application program 61, the printer driver 62 creates the print data from the image data, and outputs it to the printer 1. In order to fulfill this function, the printer driver 62 includes a resolution conversion processing section 621, a color conversion processing section 622, a halftone processing section 623, and a rasterization processing section 624.

The resolution conversion processing section 621 converts the image data with a certain resolution which is output from the application program 61 into image data with a resolution (print resolution) according to the printer 1. This converted image data correspond to multi-tone (e.g., 256-tone) data (RGB data) expressed in an RGB color space. The RGB data are data concerning pixels arranged in a two-dimensional fashion, and the data of each pixel express tone values (0 to 255) indicating red (R), green (G) and blue (B) densities. For example, a greater tone value indicates a denser color. A medium (e.g., paper or cloth) on which an image will be printed has pixels defined in accordance with the print resolution, and the data regarding pixels (tone values) indicate pixel densities (ink discharge amount) of these pixels on the medium.

The color conversion processing section 622 subjects the RGB data to a color conversion, so that the resultant data conform to the colors of ink that can be discharged by the printer 1. For example, in the case where the printer 1 performs a printing method of discharging yellow ink (Y), magenta ink (M), cyan ink (C), and black ink (K), the color conversion processing section 622 converts the RGB data into multi-tone data (e.g., 256-tone data) (YMCK data) expressed in a YMCK color space. Then the color conversion processing section 622 refers to color conversion lookup tables 631 and 632 (also referred to below as LUTs or a normal LUT or an embedding mitigation LUT, respectively) stored in a memory 63. In each of the LUTs, as shown in FIGS. 3A and 3B, the spatial-tone color values of the input image data (RGB data) correspond to the tone values of the colors of ink to be discharged by the printer 1. For example, suppose data of a pixel to be processed in the RGB data indicate 255 as an RGB value, and the color conversion processing section 622 refers to the normal LUT shown in FIG. 3A. The color conversion processing section 622 then converts the data of this pixel into tone values Vy255, Vm255, Vc255 and Vk255 that indicate the densities of yellow (Y), magenta (M), cyan (C) and black (K), respectively. The LUTs are stored in the memory 63 of the computer 60 when the printer driver 62 is installed in the computer 60; however a site in which the LUTs are stored is not limited to the memory 63 of the computer 60. Alternatively the LUTs may be stored in a memory 13 of the printer 1.

The halftone processing section 623 converts the multi-tone (e.g., 256-tone) YMCK data into data having a number of tones that can be described by the printer 1. For example, in the case where the printer 1 forms three dots having different sizes (large-sized, middle-sized and small-sized dots), an image in each pixel can be described with four tones. In this case the halftone processing section 623 converts 256-tone values in each pixel in the YMCK data into four-tone values.

The rasterization processing section 624 arranges the halftone-processed YMCK data in order of transfer to the printer 1. The data processed in this manner are sent to the printer 1 as the print data, together with other print-related data.

Printer 1

The printer 1 includes a controller 10, a transport unit 20, a drive unit 30, a head unit 40, and a detector group 50. The controller 10 in the printer 1 controls the entire printer 1. An interface section 11 sends/receives the print data and other print-related data to or from the computer 60 and some other external devices. A CPU 12 is a computing processing device that controls the entire printer 1, and controls all the units through a unit control circuit 14. The memory 13 reserves an area in which programs executed by the CPU 12 are stored and a working area for the CPU 12. The detector group 50 monitors the internal state of the printer 1, and the controller 10 performs control on the basis of the detection result of the detector group 50.

The transport unit 20 transports a continuous medium S on which images will be printed in a transport direction, more specifically, in a direction along which the continuous medium S continues. The transport unit 20 has transport rollers 21. In more detail, the transport rollers 21 supply the continuous medium S wound around a roll to a print area by feeding it, and in turn wind the printed continuous medium S around another roll by ejecting it from the print area. In this embodiment, instead of the continuous medium S, a plurality of media that are cut in a predetermined size may be used.

The drive unit 30 has an X-axis stage 31 and a Y-axis stage 32. The X-axis stage 31 moves one or more heads 41 along the transport or moving direction of the continuous medium S, and the heads discharge ink toward the continuous medium S set in the print area. The Y-axis stage 32 moves the heads 41 along a direction intersecting the transport direction, or along a width direction of the continuous medium S.

Components of the head unit 40 are a platen 42 and the heads 41. The platen 42 supports a surface of the continuous medium S opposite its print surface within the print area. The heads 41 print images on the continuous medium S supported with the platen 42 by discharging ink to the continuous medium S. The surface (the lower surface in this embodiment) of each head 41 which faces the continuous medium S is provided with a plurality of nozzle rows arranged at fixed spacings along the width direction of the continuous medium S, and each nozzle row has a plurality of nozzles (openings) from which ink is discharged. The system for discharging ink from the nozzles may employ either a piezoelectric method or a thermal method. In the piezoelectric method, a drive element (piezoelectric element) expands or shrinks an ink room in response to the applied voltage whereby ink is discharged from a nozzle. In the thermal method, a heating element is used to generate bubbles in a nozzle and these bubbles cause ink to be discharged from the nozzle. The lower surface of each head 41 in this embodiment is provided with a plurality of colored nozzle rows (colored nozzle bands) from which corresponding colored inks each containing a colorant are individually discharged. More specifically yellow, magenta, cyan and black nozzle rows are configured to discharge yellow ink (Y), magenta ink (M), cyan ink (C) and black ink (K), respectively. In addition a clear nozzle row (clear nozzle band) is configured to discharge clear ink.

The clear ink refers to colorless or transparent ink that contains no colorant. It should be noted that if the colorant of each of the colored inks (YMCK) is a pigment, the clear ink (Cl) may contain polymer fine particles in order to disperse the pigment. In addition the clear ink may include any slightly colored ink that contains polymer fine particles or some other components other than a colorant. When the colorant of each of the colored inks (YMCK) is a pigment, this colored ink may also contain polymer fine particles in order to disperse the pigment. It is preferable that the colored inks and the clear ink react with each other. This is because the reaction of the colored inks and the clear ink makes it possible to lessen the reduction in the luster of the resultant image which would occur due to the gathering of dots on the image and the uneven image surface.

The controller 10 in the printer 1 configured above performs an image creating operation by alternately repeating a discharging operation (pass) and a moving operation. In more detail during the discharging operation, the controller 10 causes the X-axis stage 31 to move the heads 41 in the moving direction. During the moving operation, the controller 10 causes the Y-axis stage 32 to move the heads 41 from the rear of the printer 1 to the front thereof along the width direction. As a result of this image creating operation, a 2D image is printed on the part of the continuous medium S which is set in the print area. After that the controller 10 performs a transport operation by causing the transport unit 20 to eject the printed part of the continuous medium S from the print area and to supply a non-printed part of the continuous medium S to the print area. By repeating both the image creating operation and the transport operation in this manner, images are printed along a direction in which the continuous medium S continues.

Creation of LUTs

The printer 1 (ink jet printer) discharges larger amounts of colored inks to the medium S when printing a denser image, in which case the colored inks are embedded in the medium (image) appropriately. The printer 1 discharges smaller amounts of colored inks when printing a fainter image, in which case the colored inks are embedded in the medium (image) poorly. However when an image having a faint color similar to the ground color (e.g., white) of the medium S is created, the embedding of the colored inks in the image tends to be less prominent. Accordingly when a middle-tone image is created, the embedding of the colored inks in the image tends to be prominent.

In order to mitigate the embedding of colored ink in the medium S, the printer 1 in this embodiment performs a printing method of discharging both colored ink and clear ink so that a droplet of the colored ink lands on a droplet of the clear ink on the medium S. Then the color density of the colored ink is decreased by the clear ink, and the colored ink spreads on the medium S while staying wet. With this method, the diameter of a dot formed with the colored ink is made larger than that formed with the colored ink alone. Consequently it is possible to mitigate the embedding of the colored ink in the medium S. For the printer 1 in this embodiment, any types of ink may be used, as long as use of colored ink and clear ink in combination achieves an effect of mitigating the embedding of the colored ink. The ink may be, for example, a water-based resin ink that contains thermoplastic resin particles and is hardened in film form when being dried. Alternatively the ink may be, for example, a water-based pigment ink, a water-based dye ink, or a UV-curable ink.

When the printer 1 in this embodiment performs the printing method of discharging both colored ink and clear ink so that a droplet of the colored ink lands on a droplet of the clear ink on the medium S, the color conversion processing section 622 refers to the embedding mitigation LUT 632 (see FIG. 3B). In the embedding mitigation LUT 632, the tone values in the RGB color space are related to the tone values of the four colored inks (YMCK) and the clear ink (Cl). In more detail when a user selects a normal mode in which the embedding of the colored ink is not mitigated, the color conversion processing section 622 refers to the normal LUT 631 (see FIG. 3A), and converts the RGB data into the YMCK data. When the user selects an embedding mitigation mode in which the embedding of the colored ink is mitigated, the color conversion processing section 622 refers to the embedding mitigation LUT 632, and converts the RGB data into Cl data that contain tone values according to the YMCK data and the discharged amount (density) of the clear ink. A description will be given below of a method of creating the embedding mitigation LUT from the normal LUT.

Figure 5A:
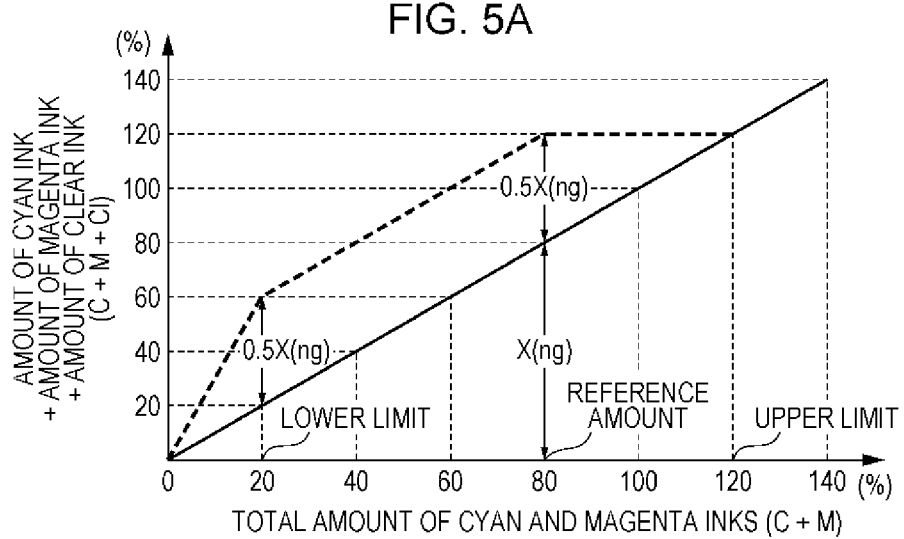
FIG. 5A is a graph showing a relationship between the amount of colored ink (C+M) to be discharged onto a unit region in a medium and the amount of clear ink to be discharged onto the unit region.
Figure 5B:
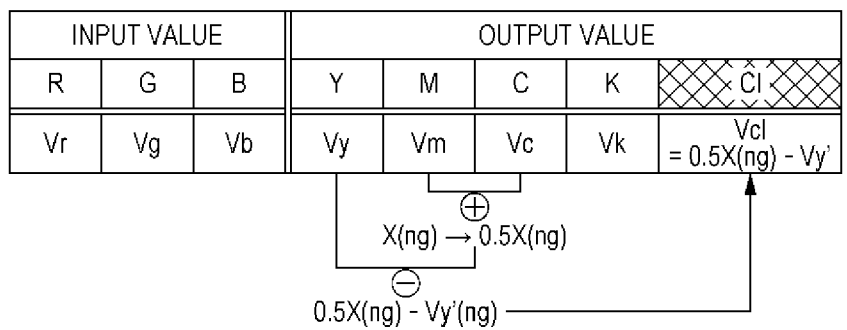
FIG. 5B shows a table used to create the embedding mitigation LUT.
Figure 5C:
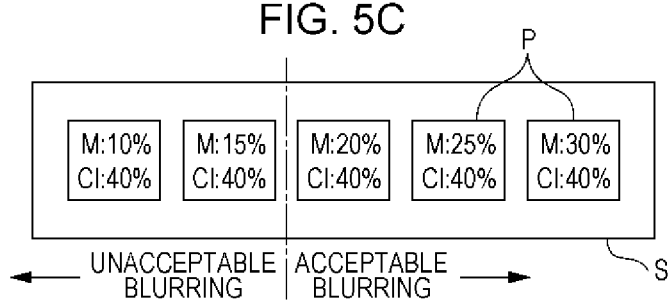
FIG. 5C shows test patches printed in order to determine the lower limit of an ink amount.

FIG. 4 shows a flowchart of processing for creating the embedding mitigation LUT 632. FIG. 5A is a graph showing the relationship between the amount of the colored ink (C+M) to be discharged onto a unit region defined in the medium S and the amount of the clear ink (Cl) to be discharged onto the unit region; FIG. 5B shows a table used to create the embedding mitigation LUT 632; FIG. 5C shows test patches printed in order to determine the lower limit of an ink amount. In this embodiment, it is assumed that the printer 1 in this embodiment uses a single type of medium, and the LUTs are set in accordance with this medium. However, the invention is not limited to this assumption; the printer 1 may use multiple types of media and each of the LUTs may be set for each medium or commonly set for the multiple types of media.

Out of the inks discharged by the printer 1, densely colored inks, or the cyan ink and the magenta ink, tend to be prominent when they are embedded in the medium S, but a faintly colored ink, or yellow ink, tends to be less prominent even when it is embedded in the medium S. Black ink has a dense color, but in many cases it is used to print letters, characters or the like that does not typically involve the need to mitigate the embedding of ink. When a picture, drawing, or the like that typically involve the need to mitigate the embedding of ink is printed, in many cases the black (composite black) color is created from a mixture of yellow ink, cyan ink and magenta ink. Therefore the embedding of black ink tends to be less prominent. In consideration of the above, in this embodiment, the amount by which the clear ink is discharged onto the unit region of the medium S is determined on the basis of the total amount of the cyan ink C and the magenta ink M included in the colored inks to be discharged onto the unit region.

In the graph of FIG. 5A, the lateral axis represents the total amount (C+M) of the cyan ink and the magenta ink to be discharged onto the unit region of the medium S; the vertical axis represents the total amount (C+M+Cl) of the cyan ink, magenta ink and clear ink to be discharged onto the unit region. Moreover, in the graph of FIG. 5A, a solid line represents the total amount of the discharged ink in the normal mode where the clear ink is not discharged; a dotted line represents the total amount of the discharged ink in the embedding mitigation mode where the clear ink is discharged. In this embodiment, the amount of ink is also denoted by an "ink duty (%)," and both lateral and vertical axes in the graph of FIG. 5A are denoted by the ink duty (%). The ink duty (%) refers to the proportion of the number of dots created in the unit region of the medium S. More specifically the ink duty (%) is given by "(the number of dots formed in the unit region of the medium S)/(the number of pixels constituting the unit region of the medium S)×100."

It is preferable that the medium S used by the printer 1 in this embodiment possess a property of absorbing the ink used by the printer 1. For example, the medium S may have an ink-absorbent substrate like paper, or an ink-unabsorbent substrate and an ink-absorbent layer provided on the substrate. Ink-absorbent substrates possess limited ink-absorbent capacity. Therefore if ink is discharged beyond the ink-absorbent capacity of a medium, the unabsorbed part of the ink may spread over the medium. This may cause an occurrence of blurring, mixing of colors, or gathering of inks (the nonuniformity of the density) on the resultant image. In order to avoid such disadvantages, the upper limit of the amount by which the printer 1 is allowed to discharge ink onto the unit region is set for the ink-absorbent medium. In more detail both a "unicolored ink duty upper limit (%)" and a "multicolored ink duty upper limit (%)" are set. Here the unicolored ink duty upper limit refers to the upper limit of the amount by which the printer 1 is allowed to discharge unicolored ink to the unit region of the medium S; the multicolored ink duty upper limit refers to the upper limit of the total amount by which the printer 1 is allowed to discharge all the types of ink to the unit region of the medium S.

For example, in the case where the printer 1 can form dots of three sizes (large-sized, middle-sized, and small-sized dots), both the unicolored ink duty upper limit and the multicolored ink duty upper limit are given by (the number of large sized dots formed in the unit region of the medium)/(the number of pixels constituting the unit region of the medium)×100. For the medium S used by the printer 1 in this embodiment, for example, suppose the unicolored ink duty upper limit is 80%, the multicolored ink duty upper limit is 140%, and the number of pixels constituting the unit region of the medium is 720×720 pixels. The printer 1 can form 720×720× 0.8 large-sized dots in the unit region of the medium S by using a single certain colored ink. Alternatively the printer 1 can form 720×720×1.4 large-sized dots by using all the colored inks. In the case where the amount of ink required to form a single large-sized dot is 15 ng, the printer 1 is allowed to discharge unicolored ink to the unit region of the medium S by an amount X (720×720×0.8×15 ng).

In creating the embedding mitigation LUT 632 from the normal LUT 631 (see FIG. 4), the controller 10 first determines the reference amount of the clear ink to be discharged onto the unit region of the medium S, in relation to the reference total amount of the cyan ink and the magenta ink to be discharged onto the unit region (S01). In this embodiment, the reference total amount of the cyan ink and the magenta ink is set to the unicolored ink duty upper limit (80%). Then when the total amount of the cyan ink and the magenta ink is 80% ink duty (ink amount X (ng)), the amount of the clear ink to be discharged onto the unit region, or the reference amount of the clear ink, is set to half the total amount of the cyan ink and the magenta ink (in this case the ink duty is 40%, and the ink amount is 0.5X (ng)). Referring to the graph in FIG. 5A, when the amount (C+M) on the lateral axis indicates 80%, the amount (C+M+Cl) on the vertical axis indicates 120% in the embedding mitigation mode (indicated by a dotted line). Thus it can be seen that the reference amount of the clear ink is 40%.

The unicolored ink duty upper limit (80%) is lower than the multicolored ink duty upper limit (140%). Therefore even when the amount (120%) of the clear ink is added to the unicolored ink duty upper limit (80%), this result is less likely to exceed the multicolored ink duty upper limit (140%). Therefore when the printer 1 discharges the clear ink in order to mitigate the embedding of the ink in the medium S, it determines the reference amount of the clear ink (40%) with reference to the unicolored ink duty upper limit (80%). This enables the ink to be suppressed from being discharged beyond the ink-absorbent capacity of the medium S. It is thus possible to reduce the blurring and the like of the resultant image.

In this embodiment, the ratio of the amount (40%) of the clear ink to the total amount (80%) of the cyan ink and the magenta ink is set to 50%; however this ratio is not restrictive. For example, if a medium on which an ink is likely to be blurred and spread, or a medium in which an ink is embedded appropriately, is used, the amount of the clear ink may be set to 25%. Furthermore if a medium on which an ink is less likely to spread and be blurred is used, the amount of the clear ink may be set to 75%. In the case where each LUT is commonly applied to a plurality of media, a plurality of embedding mitigation LUTs that contain different ratios of the amount of the clear ink to the total amount of the cyan ink and the magenta ink may be created. Then the user may select the one best suited for a medium to be used. Even in the case where each LUT is set for each medium, a plurality of embedding mitigation LUTs may be created for each medium, and the user may select the one best suited for a requirement, for example, in which the embedding of ink is mitigated strongly or the consumption of the clear ink is reduced.

Next the amount of the clear ink is determined when the total amount of the cyan ink and the magenta ink to be discharged onto the unit region of the medium S fall within a range from the reference amount to the upper limit (S02). If the printer 1 discharges ink beyond the ink-absorbent capacity of the medium S, blurring and the like may occur in the resultant image. In order to avoid such disadvantages, when the total amount (ink duty) of the cyan ink and the magenta ink to be discharged onto the unit region of the medium S is equal to or more than 80%, the total amount of the cyan ink, magenta ink and clear ink to be discharged onto the unit region of the medium S is set so as not to exceed the sum of the total reference amount (80%) of the cyan ink and the magenta ink and the reference amount of the clear ink (40%). As shown in the graph of FIG. 5A, accordingly, when the total amount of the discharged cyan ink and magenta ink on the lateral axis is equal to or more than 80%, the amount of the discharged clear ink gradually decreases as the total amount of the discharged cyan ink and magenta ink increases, in the embedding mitigation mode (indicated by the dotted line). Then no clear ink is discharged when the total amount of the cyan ink and the magenta ink to be discharged onto the unit region of the medium S is equal to more than 120%. In this manner the amount of the clear ink to be discharged onto the unit region of the medium S decreases, as the total amount of the cyan ink and the magenta ink to be discharged onto the unit region increases. In this case no serious disadvantages would arise because the cyan ink and the magenta ink are embedded appropriately in the medium S.

Next the controller 10 determines the amount of the clear ink to be discharged onto the unit region of the medium S when the total amount of the cyan ink and the magenta ink to be discharged onto the unit region is equal to or less than the reference amount (S03). When the total amount of the cyan ink and the magenta ink to be discharged onto the unit region of the medium S is equal to or less than 80%, the amount of the clear ink to be discharged onto the unit region is set to a constant, more specifically, the reference amount (40%). However when the total amount of the cyan ink and the magenta ink excessively decreases, an excessive large amount of clear ink may be discharged. Therefore a lower limit (40%) at which a fixed amount of clear ink is discharged onto the unit region S of the medium is determined.

In determining the lower limit, the printer 1 prints a plurality of test patches P by using the magenta ink and the clear ink in combination, as shown in FIG. 5C. Alternatively the printer 1 may print the test patches P by using the cyan ink and the magenta ink in combination or the cyan ink alone. In more detail the printer 1 prints the test patches P on the medium S by using a fixed amount of clear ink (ink duty 40%) and different amounts of magenta ink in combination. Here the amounts of magenta ink are candidates for the lower limit (in FIG. 5C, these amounts are set within the ink duty range from 10% to 30% in steps of 5%). Then the user selects the one showing the most prominent blurring from the test patches P, for example, with the naked eye, and determines the lower limit. In FIG. 5C, the test patch P created using 15% of the magenta ink shows the most prominent blurring, and therefore the user may determine that the lower limit is 20%.

In consideration of the above result, when the total amount of the cyan ink and the magenta ink to be discharged onto the unit region of the medium S falls within a range from the reference amount (80%) to the lower limit (20%), the amount of the clear ink to be discharged onto the unit region is set to the reference amount of the clear ink. When the total amount of the cyan ink and the magenta ink to be discharged onto the unit region of the medium S is equal to or lower than the lower limit (falls within a range of 0% to 20%), the amount of the clear ink to be discharged onto the unit region of the medium S gradually decreases from the reference amount (40%). This is how the amount of the clear ink to be discharged onto the unit region of the medium S becomes approximately 0 when the total amount of the cyan ink and the magenta ink to be discharged onto the unit region becomes approximately 0%. Accordingly, referring to the graph shown in FIG. 5A, in the embedding mitigation mode (indicated by the dotted line), a point at which the total amount (C+M) on the lateral axis is 20% and the total amount (C+M+Cl) on the vertical axis is 60% is connected with a point at which both the total amount (C+M) on the lateral axis and the total amount (C+M+Cl) on the vertical axis are 0% by a straight line. In this manner a small amount of clear ink is discharged onto the unit region of the medium S, when the total amount of the cyan ink and the magenta ink to be discharged onto the unit region decreases, or falls within a range of 0% to 20%. In this case no serious disadvantages would arise, because ink embedded in a faint image having a similar color to the ground color of the medium S is less prominent.

In this manner, as shown in the graph of FIG. 5A, the amount of the clear ink to be discharged onto the unit region of the medium S is determined in relation to the total amount (0% to 140%) of the cyan ink and the magenta ink to be discharged onto the unit region. However the method of determining the amount of the discharged clear ink is not restrictive. For example, the reference point at which the total amount (C+M) on the lateral axis is 80% and the total amount (C+M+Cl) on the vertical axis is 120% is connected with a point at which both the total amount (C+M) on the lateral axis and the total amount (C+M+Cl) on the vertical axis are 0% by a line having a constant gradient. Then a larger amount of clear ink may be discharged onto the unit region of the medium S as the total amount of the total amount of the cyan ink and the magenta ink to be discharged onto the unit region increases.

Figure 6A:
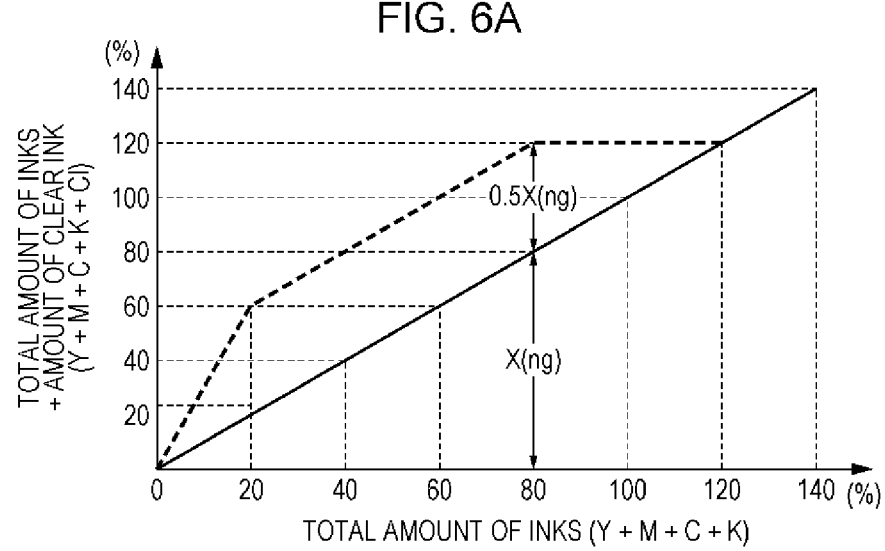
FIG. 6A is a graph showing a relationship between colored ink (Y+M+C+K) to be discharged onto the unit region of the medium and the amount of the clear ink to be discharged onto the unit region.
Figure 6B:
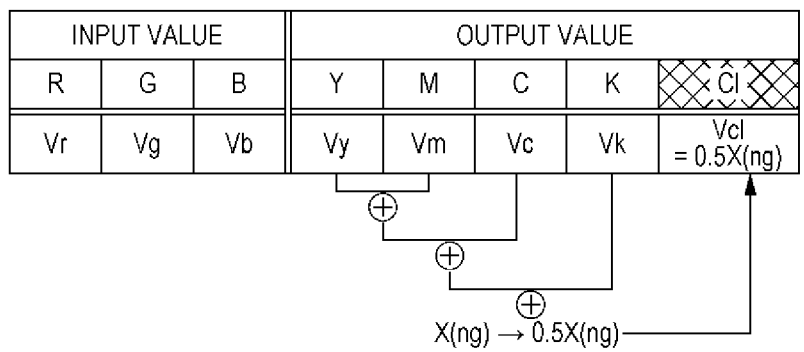
FIG. 6B shows a table used to create an embedding mitigation LUT of a comparative example.
Figure 6C:
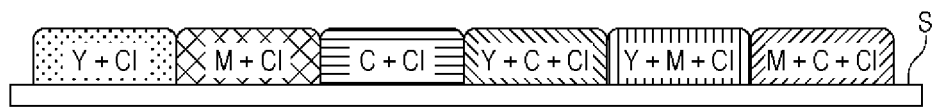
FIG. 6C shows an image printed by a printing method of the comparative example.

Here, an embedding mitigation LUT of a comparative example will be described below. FIG. 6A is a graph showing a relationship between the total amount of all the colored inks (Y+M+C+K) to be discharged onto the unit region of the medium S and the amount of the clear ink (Cl) to be discharged onto the unit region. FIG. 6B shows a table used to create the embedding mitigation LUT of the comparative example. FIG. 6C shows an image printed by a printing method of the comparative example. In the comparative example, the computer 60 determines the amount of the clear ink (Cl) to be discharged onto the unit region of the medium S, on the basis of the total amount of all the colored inks (Y+M+C+K) to be discharged onto the unit region. In the graph of FIG. 6A, the lateral axis indicates the total amount of all the colored inks (Y+M+C+K) to be discharged onto the unit region of the medium S; the vertical axis indicates the sum (Y+M+C+K+Cl) of the total amount of all the colored inks to be discharged onto the unit region of the medium S and the amount of the clear ink Cl to be discharged onto the unit region. The graph (FIG. 6A) in the comparative example and the graph (FIG. 5A) in this embodiment have different parameters represented by the lateral and vertical axes, but show substantially the same tendency. For example, in the comparative example, when the total amount of all the colored inks (YMCK) to be discharged onto the unit region of the medium S falls within a range of 20% to 80%, the clear ink is discharged onto the unit region by 40%.

As shown in FIG. 6B, the computer 60 creates the embedding mitigation LUT of the comparative example, on the basis of the amount of the clear ink (Cl) discharged onto the unit region of the medium S which is related to the total amount (0% to 140%) of all the colored inks (YMCK) discharged onto the unit region. For example, suppose the tone values of the yellow, magenta, cyan and black are set to Vy, Vm, Vc and Vk, respectively, in relation to a certain RGB input value (R=Vr, G=Vg and B=Vb) in the normal LUT. When the sum of the respective amounts corresponding to the tone values Vy, Vm, Vc and Vk of the yellow, magenta, cyan and black is X (ng), or 80% ink duty, the computer 60 acquires 0.5X (ng), or 40% (ink duty), of the clear ink from the graph of FIG. 6A. Then the computer 60 adds a tone value corresponding to the ink amount of 0.5X (ng) to the table of FIG. 6B, as a tone value Vcl of the clear ink, in relation to the certain input tone value in the normal LUT.

A dot generation ratio for the unit region of the medium S is related to 256-tone values (0 to 255) contained in the data of each pixel. The dot generation ratio refers to a ratio of the total number of pixels constituting a unit region of a medium to the number of pixels each having a dot formed therein, under the condition that all the pixels have a constant value. For example, suppose the unit region is constituted by 720 pixels× 720 pixels, the tone value indicated by each pixel in the unit region is N, and an n number of dots are created in the unit region. The dot generation ratio (%) at the constant value N can be given by {n/(720 pixels×720 pixels)}×100. This is how it is possible to convert a 256-tone value into a corresponding ink amount, or the amount of ink to be discharged onto the unit region of the medium S, by using the dot generation ratio related to each 256-tone value.

The printer 1 prints an image, as shown in FIG. 6C, from the print data based on the embedding mitigation LUT of the comparative example which has been created in the above manner. Specifically even when any of image parts (Y), (M), (C), (Y+C), (Y+M) and (M+C) created by the yellow ink alone, the magenta ink alone, the cyan ink alone, both the yellow ink and the cyan ink, both the yellow ink and the magenta ink, and both the magenta ink and the cyan ink, respectively, is printed, both a corresponding colored ink and the clear ink are discharged.

In the comparative example, as described above, the clear ink is uniformly discharged onto an entire image, regardless of which colored ink is used to print the image. As a result a large amount of ink is discharged onto the medium S. To give an example, suppose a total 40% of all the colored inks (YMCK) are discharged onto the unit region of the medium S, and a total 10% of cyan ink and magenta ink are discharged. In this embodiment (see FIG. 5A), the clear ink is discharged onto the unit region by 40% or less. In contrast, in the comparative example (see FIG. 5B), clear ink is discharged onto the unit region by 40%. This means that an extra amount of clear ink which corresponds to the total amount of the yellow ink and the black ink is discharged. To give another example, when only the yellow ink is discharged onto the unit region of the medium S, the clear ink is not discharged to the unit region in this embodiment (see FIG. 5A), but it is discharged in the comparative example (see FIG. 5B). In the comparative example, therefore, the clear ink is discharged onto a region to which neither of the cyan ink and the magenta ink is discharged. Consequently in the comparative example, the embedding of the colored inks in the medium S can be mitigated by the clear ink, but the quality of the resultant image may be lowered due to an occurrence of blurring, mixing of colors or gathering of the inks, because colored ink is excessively discharged onto the medium S.

In conclusion it is preferable that the amount by which the clear ink is discharged onto a unit region defined in a medium be determined on the basis of the total amount of cyan ink and magenta ink to be discharged onto the unit region, as in this embodiment. This enables the clear ink to be discharged onto the unit region of the medium only by an amount required to mitigate the embedding of the cyan ink. Specifically the clear ink is discharged together with the cyan ink and the magenta ink, and its amount is independent of the amount of yellow or black ink discharged onto the unit region. As a result the clear ink can be prevented from being discharged onto the unit region to which neither of the cyan ink and magenta ink is discharged. It is thus possible for this embodiment to mitigate the embedding of cyan ink and magenta ink in a medium and to make the amount of clear ink discharged onto the medium smaller than that in the comparative example, thereby curbing an occurrence of blurring, mixing of colors, and gathering of inks which would occur in resultant images.

This embodiment does not mitigate the embedding of yellow or black ink in a medium, because the clear ink is not discharged together with these colored inks. As described above, however, when ink of a faint color such as yellow is embedded in a medium, it tends to be less prominent. In addition black ink is used to print letters, characters and the like that do not involve the need to mitigate the embedding of ink. Therefore no serious disadvantages would occur even when clear ink is not discharged together with yellow or black ink.

If the printer 1 prints an image in accordance with print data in the embedding mitigation LUT of the comparative example, the image may exhibit lowered color reproducibility, because colors in part of the image which is printed with the yellow ink would become dull. In particular the color region of yellow to red exhibits lowered color reproducibility. A reason is that the yellow ink, which is faintly colored ink, plays the same role as the clear ink. In more detail when droplets of the magenta ink and the cyan ink land on droplets of the yellow ink on the medium, the color densities of the magenta ink and the cyan ink are decreased by the yellow ink, and the magenta ink droplet and the cyan ink droplet spread on the yellow ink droplets while staying wet. As a result the diameters of dots formed with the magenta ink and the cyan ink are increased. This means that an extra amount of clear ink which corresponds to the amount of the yellow ink is discharged onto part of the image which is printed with the yellow ink. As a result the density of the colored ink in the image may be excessively decreased, and therefore its color reproducibility would be lowered.

In contrast the computer 60 in this embodiment determines a first amount on the basis of the total amount of the cyan ink and the magenta ink to be discharged onto the unit region of the medium S. Then the computer 60 determines a second amount by subtracting the amount of the yellow ink to be discharged onto the unit region from the first amount. Finally the printer 1 discharges the clear ink onto the unit region by the second amount. Specifically, as shown in FIG. 5B, the computer 60 derives the total ink amount of the magenta ink and the cyan ink from the respective tone values of the magenta and the cyan for each RGB input value in the normal LUT 631, and determines the first amount on the basis of this total ink amount. Then the computer 60 determines the tone value of the clear ink on the basis of the second amount obtained by subtracting the ink amount according to the tone value of the yellow from the first amount (S04 in FIG. 4).

Suppose the respective tone values of the yellow, magenta, cyan and black are set to Vy, Vm, Vc and Vk in relation to a certain RGB input value (R=Vr, G=Vg and B=Vb) in the normal LUT 631, and the sum of respective ink amounts according to the tone value Vm of the magenta and the tone value Vc of the cyan is X (ng), or 80% ink duty. The computer 60 derives 0.5X (ng), or 40% ink duty, of the clear ink from the graph in FIG. 5A, and subtracts an ink amount Vy' (ng) according to the tone value of the yellow from the clear ink amount (0.5X (ng)). The computer 60 adds a tone value according to the clear ink amount (0.5X−Vy' (ng)) determined in this manner to the embedding mitigation LUT 632, as the tone value Vcl of the clear ink which is related to the RGB input tone value.

Alternatively the following method may be employed. First the computer 60 subtracts an ink amount according to the tone value of the yellow from a total ink amount according to the respective tone values of the magenta and the cyan. Then the computer 60 determines the amount of the discharged clear ink from the resultant value and the graph in FIG. 5A, and sets a tone value according to the determined amount to the embedding mitigation LUT 632 as the tone value Vcl of the clear ink.

When the printer 1 prints an image in accordance with the print data in the embedding mitigation LUT 632 created in the above manner, the computer 60 first determines a first amount on the basis of the total amount of the cyan ink and the magenta ink to be discharged onto the unit region of the medium S. Then the computer 60 determines a second amount by subtracting the amount of the yellow ink to be discharged onto the unit region from the first amount. Finally the printer 1 discharges the clear ink onto the unit region by the second amount. As a result the clear ink is suppressed from being excessively discharged onto part of an image in which the yellow ink will be used. It is thus possible to lessen the dulling of the color and the reduction in the color reproducibility. In this case although the amount of discharged clear ink decreases, the embedding of the colored ink in the medium S is mitigated. This is because droplets of the cyan ink and the magenta ink spread on droplets of the yellow ink while staying wet. Furthermore, a smaller amount of clear ink is discharged onto the medium S than when it is determined only on the basis of the total amount of the cyan ink and the magenta ink to be discharged onto the unit region of the medium S. It is thus possible to further reduce the blurring of the image.

The color conversion processing section 622 refers to the embedding mitigation LUT 632, and converts RGB data into YMCK data and Cl data. Then the halftone processing section 623 converts the 256-tone values of the YMCK data and the Cl data into 4-tone values. In this case if the tone values of the cyan and the magenta in a certain pixel on the medium S considerably increase (the densities of the cyan and the magenta increase), cyan and magenta dots are quite likely to be formed in this pixel. Furthermore if the cyan and the magenta in a pixel that have been subjected to the color conversion have considerably large tone values in the embedding mitigation LUT 632 of this embodiment, the clear ink in this pixel also has a large tone value. Therefore a dot of the clear ink is quite likely to be formed in the pixel on the medium S. Thus a dot of the clear ink and a cyan or magenta dot are formed in the same pixel with a high probability. In this case the cyan or magenta dot lands on the dot of the clear ink Cl, so that the embedding of the cyan ink and the magenta ink in the medium S is mitigated.

Printing Method

Figure 7A:
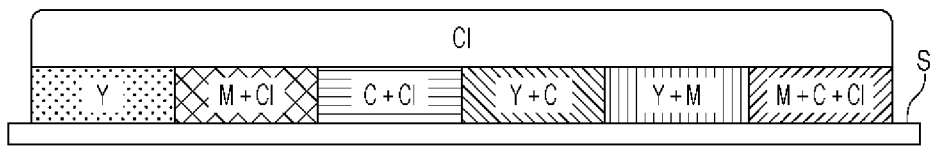
FIG. 7A shows an image printed by a printing method according to an embodiment of the invention.
Figure 7B:
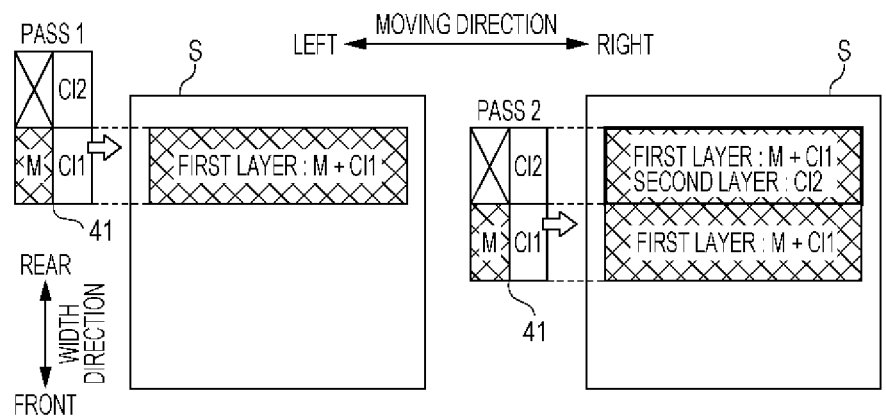
FIGS. 7B and 7C are explanatory views of the printing method in the embodiment.
Figure 7C:
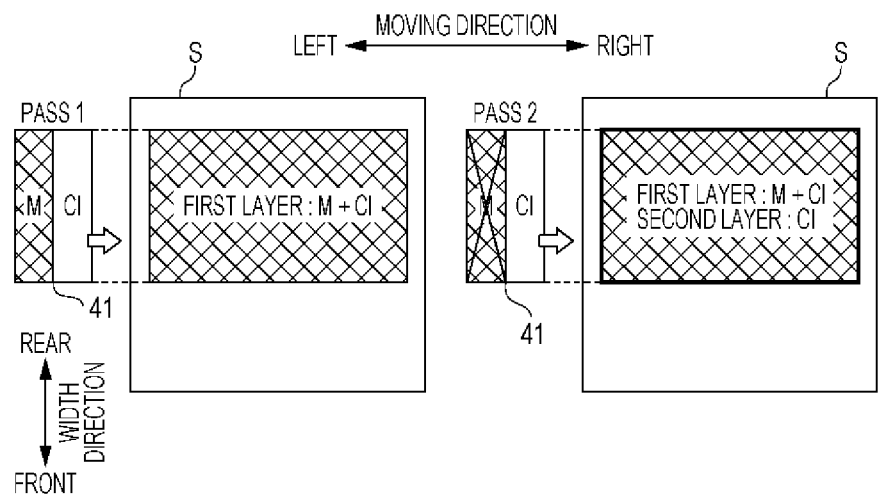

FIG. 7A shows an image printed by a printing method in this embodiment; FIGS. 7B and 7C are explanatory views of the printing method in this embodiment. In FIGS. 7B and 7C, an image is printed with the magenta ink. The controller 10 (control unit) of the printer 1 in this embodiment refers to the print data created in the embedding mitigation LUT 632, and determines a first amount on the basis of the total amount of the cyan ink and the magenta ink to be discharged onto the unit region of the medium S. Then the controller 10 determines a second amount by subtracting the amount of the yellow ink to be discharged onto the unit region from the first amount. Finally the printer 1 discharges the clear ink toward the unit region by the second amount, and discharges the colored inks including one or both of the cyan ink and the magenta ink toward the unit region. In this case it is necessary for the printer 1 to discharge the clear ink and the colored inks toward the unit region through the same pass, in order to land droplets of the colored inks on uncured droplets of the clear ink.

As shown in FIG. 7A, when the printer 1 prints the image parts (M), (C) and (M+C) formed with the magenta ink alone, the cyan ink (C) alone, and both the magenta ink and the cyan ink, respectively, it discharges the colored inks and the clear ink. When the printer 1 prints the image parts (Y), (Y+C) and (Y+M) formed with the yellow ink alone, both the yellow ink and the cyan ink, and both the yellow ink and the magenta ink, respectively, it does not discharge the clear ink. However if the amount of the clear ink which has been determined on the basis of the total amount of the cyan ink and the magenta ink to be discharged onto the unit region exceeds the amount of the yellow ink to be discharged onto the unit region, the printer 1 discharges the clear ink. This is how the printing method in this embodiment can mitigate the embedding of the cyan ink and the magenta ink in the medium S and curb an occurrence of blurring, mixing of colors, and gathering of inks in the resultant image. When an image is printed using the yellow ink, it is possible to further curb the occurrence of the blurring and the lowering of the color reproducibility in the image.

In the printing method in this embodiment, as shown in FIG. 7A, the printer discharges the clear ink to the image printed on the medium S with the colored inks (YMCK) and the clear ink (Cl), thereby forming a coating layer on the image. Here the image printed with the colored inks and the clear ink is a first layer; the coating layer is a second layer. By covering the image of the first layer with the coating layer, the resistance of the image of the first layer to abrasion can be enhanced. Moreover, the surface unevenness of the image is reduced, so that the luster of the image can be increased. However this layer structure is not restrictive; the coating layer does not necessarily have to be formed on the image.

When the printer 1 in this embodiment forms the coating layer on the image printed on the medium S with the colored ink and the clear ink, preferably it discharges the clear ink from a clear nozzle row which is the same as that used to print the image. In other words it is preferable for the printer 1 to use the same nozzle row when discharging the clear ink intended to mitigate the embedding of the colored ink and to form the coating layer. This enables the number of nozzles provided in each head 41 to be decreased, which leads to the cost reduction. However this scheme is not restrictive; different nozzle rows may be used in order to mitigate the embedding of the colored ink and to form the coating layer.

In the printing method in this embodiment, the printer 1 first discharges the clear ink from nozzles toward the unit region of the medium S, and then discharges the colored inks from nozzles toward the unit region. The colored inks are accordingly ejected onto the unit region after the clear ink is ejected onto the unit region. As a result the colored inks are readily left on the surface of the medium S, and therefore the color reproduction of the image is enhanced. Moreover since the consumption of the colored inks is decreased, the cost reduction is achieved. However this scheme is not restrictive; the colored inks may be discharged from nozzles before the clear ink is discharged from nozzles.

In FIG. 7B or 7C, an exemplary printing process embodying the above printing method is shown. In the printing process shown in FIG. 7B, nozzle rows extending along the width direction of the medium S is each equally divided into two parts, and they are used separately. Specifically in Pass 1, the printer 1 prints the image of the first layer by using nozzles M and C11 in combination. Here the nozzles M constitute a half part of a magenta nozzle row and are arranged on the front side with respect to the width direction; the nozzles C11 constitute a half part of a clear nozzle row and are arranged on the front side with respect to the width direction. Then the printer 1 moves the heads 41 forward along the width direction by a half of the length of each nozzle row. In Pass 2, the print 1 forms the coating layer on the image printed in Pass 1 by using nozzles C12 that constitute the other half part of the clear nozzle row and are arranged on the rear side with respect to the width direction.

In the printing process shown in FIG. 7C, in Pass 1, the printer 1 prints the image of the first layer by using all the nozzles M in the magenta nozzle row and all the nozzles Cl in the clear nozzle row. Then the printer 1 performs Pass 2 without moving the heads 41 along the width direction. As a result, in Path 2, the coating layer can be formed on the image formed in Pass 1 by all the nozzles Cl in the clear nozzle row.

As shown in FIG. 7B or 7C, if the heads 41 move from the left to the right along the moving direction, it is preferable for the clear nozzle row to be positioned on the right side of both a cyan nozzle row and the magenta nozzle row with respect to the moving direction. This enables the colored inks to be discharged onto the medium S after the clear ink is discharged onto the medium S. Alternatively two clear nozzle rows may be disposed on both the sides of the cyan nozzle row and the magenta nozzle row with respect to the moving direction. This enables the colored inks to be discharged onto the medium S after the clear ink is discharged onto the medium S, even when the heads 41 move to either side with respect to the moving direction.

In this embodiment, the computer 60 (control unit) connected to the printer 1 refers to the embedding mitigation LUT 632 (color conversion memory) in which tone values of RGB data (input image data) in the color space are related to tone values of each color in the colored ink (YMCK) and the clear ink (Cl). Then the computer 60 determines the amount by which the clear ink is discharged onto the unit region of the medium S, by subjecting the RGB data to the color conversion. Followed by the controller 10 (control unit) in the printer 1 discharges the clear ink from the clear ink nozzle row by the determined amount. Therefore both the computer 60 and the printer 1 connected to each other configure a printing system, which configures a printing unit. However the configuration of the printing unit is not restrictive; the controller 10 in the printer 1 may determine the amount by which the clear ink is discharged onto the unit region of the medium S. In this case the printer 1 configures the printing unit by itself.

Modification

The computer 60 in the foregoing embodiment determines a first amount on the basis of the total amount of cyan ink and magenta ink to be discharged onto the unit region of a medium. Then the computer 60 determines a second amount by subtracting the amount of yellow ink to be discharged onto the unit region from the first amount. However this method is not restrictive; the subtraction of the yellow ink amount may be skipped. Alternatively for a certain RGB input value in a normal LUT, the computer 60 may determine the amount of the clear ink on the basis of the sum of the respective ink amounts corresponding to the tone values of the magenta and the cyan. Then the computer 60 may create an embedding mitigation LUT by using a tone value according to the determined amount of the clear ink as the tone value of the clear ink. In this case it is also possible to mitigate the embedding of the colored ink in the medium and to reduce the blurring of the image and the like, as opposed to the foregoing comparative example.

The computer 60 in the foregoing embodiment creates an embedding mitigation LUT so that clear ink is discharged onto the unit region of a medium by an amount determined on the basis of the total amount of cyan ink and magenta ink to be discharged onto the unit region. However this scheme is not restrictive; for example, data concerning the clear ink may be added to YMCK data that have been subjected to the halftone process. In more detail, data that indicate the forming of a dot of the clear ink may be added to pixels in each of which one or both of a cyan dot and a magenta dot will be formed (preferably no yellow dot will be formed) out of pixels in halftone-processed data. In addition data that indicate the forming of no dot of the clear ink may be added to pixels in each of which neither of a cyan dot and a magenta dot is formed. With the above print data, an image can be printed on the medium while the embedding of the colored ink in the medium is mitigated and the blurring and the like are reduced.

The printer 1 in the foregoing embodiment discharges four colored inks (YMCK); however colored inks used by the printer 1 are not limited to these four colored inks, and the printer 1 may discharge other colored inks, such as green ink, orange ink and white ink. In this case if the printer 1 discharges a certain colored ink that is not embedded in a medium appropriately, like cyan ink or magenta ink, the computer 60 may determine the amount of the clear ink to be discharged onto the unit region of a medium, in consideration of the amount of this colored ink to be discharged onto the unit region in addition to the total amount of the cyan ink and the magenta ink to be discharged onto the unit region.

Other Embodiments

The foregoing embodiment is intended to facilitate the understanding of the invention, and does not serve to interpret the invention in a limited manner. Various modifications and variations may be possible without departing from the spirit of the invention, and equivalents of the embodiment are also included in the invention.

The exemplary printer 1 in the foregoing embodiment repeats: an operation of printing a 2D image on a part of a continuous medium which is set in a print area while moving the heads 41 in the X and Y directions; and an operation of supplying a new part of the continuous medium to the print area. However the operations of the printer are not restrictive. Alternatively another exemplary printer may be used, which repeats an operation of causing heads to discharge ink while moving the heads in a direction intersecting the nozzle rows (in the width direction of a medium) and an operation of transporting the medium in a direction along the nozzle rows (in a direction along which the medium continues if the medium is of a continuous type). Still another exemplary printer may be used, which repeats an operation of discharging ink onto a medium moving in an X direction with respect to heads and an operation of moving the medium in a Y direction with respect to the heads. Further another exemplary printer may be used, which has heads in each of which nozzles are arrayed along the width direction of a medium so as to extend beyond the width of the medium, and discharges ink toward the medium while transporting the medium beneath the heads in a direction intersecting the width direction.

The entire disclosure of Japanese Patent Application No. 2013-042994, filed Mar. 5, 2013 is expressly incorporated by reference herein.

What is claimed is:

1. A printing method of creating an image on a medium by discharging a plurality of colored inks each containing a colorant and clear ink containing no colorant from a nozzle toward the medium, the printing method comprising:
    discharging the colored inks from the nozzle toward a unit region defined in the medium by an amount determined on the basis of respective amounts of cyan ink and magenta ink included in the colored inks to be discharged onto the unit region; and
    discharging the clear ink from the nozzle to decrease the color density of the colored ink,
    wherein when the amount of the cyan and magenta ink discharged is in a range between a high reference value and a low reference value, the amount of clear ink discharged is a constant reference value and when the amount of the cyan and magenta ink discharged falls below the low reference value, the amount of clear ink discharged decreases below the constant reference value.

2. The printing method according to claim 1, wherein
    the clear ink is discharged from the nozzle toward the unit region of the medium by a second amount, the second amount being obtained by subtracting an amount of yellow ink included in the colored inks to be discharged to the unit region from a first amount, the first amount being determined on the basis of the respective amounts of the cyan ink and the magenta ink to be discharged onto the unit region.

3. The printing method according to claim 1, wherein
    first the clear ink is discharged from the nozzle toward the unit region of the medium, and then the colored inks are discharged from the nozzle toward the unit region.

4. The printing method according to claim 1, further comprising:
    forming a coating layer on the image having been formed on the medium with the colored inks and the clear ink, by discharging the clear ink from the nozzle onto the image.

5. A printing apparatus comprising:
    a plurality of colored nozzle groups that can individually discharge a plurality of colored inks, each of the colored inks containing a colorant, the colored inks including cyan ink and magenta ink;
    a clear nozzle group that can discharge clear ink, the clear ink containing no colorant; and
    a control section that determines an amount by which the clear ink is discharged onto a unit region defined in a medium, on the basis of respective amounts of the cyan ink and the magenta ink to be discharged onto the unit region, and that creates an image on the medium by causing the clear nozzle group to discharge the clear ink toward the unit region by the determined amount to decrease a density of the plurality of colored inks and causing the colored nozzle groups to discharge the colored inks toward the unit region, wherein when the amount of the cyan and magenta ink discharged is in a range between a high reference value and a low reference value, the amount of clear ink discharged is a constant reference value and when the amount of the cyan and magenta ink discharged falls below the low reference value, the amount of clear ink discharged decreases below the constant reference value.

6. The printing apparatus according to claim 5, wherein
    the control section determines a second amount by which the clear ink is discharged onto the unit region of the medium, the second amount being obtained by subtracting an amount of yellow ink included in the colored inks to be discharged onto the unit region from a first amount, the first amount being the amount of clear ink which has been determined on the basis of the respective amounts of the cyan ink and the magenta ink to be discharged onto the unit region.

7. The printing apparatus according to claim 5, wherein
    the control section refers to a color conversion table in which a tone value of input image data in a color space is related to a tone value of each color of the plurality of colored inks and the clear ink, and determines the amount by which the clear ink is discharged onto the unit region of the medium, by subjecting the input image data to a color conversion.

8. The printing apparatus according to claim 5, wherein
    the control section forms a coating layer on the image having been formed on the medium with the colored inks and the clear ink by causing the clear nozzle group to discharge the clear ink onto the image, the clear nozzle group having been used to form the image.

* * * * *